(12) United States Patent
Karau

(10) Patent No.: US 8,635,947 B2
(45) Date of Patent: Jan. 28, 2014

(54) BARBECUE FIREBOX AND METHOD OF OPERATION

(76) Inventor: William H. Karau, Southlake, TX (US)

( * ) Notice: Subject to any disclaimer, the term of this patent is extended or adjusted under 35 U.S.C. 154(b) by 200 days.

(21) Appl. No.: 13/038,212

(22) Filed: Mar. 1, 2011

(65) Prior Publication Data

US 2011/0217441 A1 Sep. 8, 2011

Related U.S. Application Data

(63) Continuation of application No. 11/796,250, filed on Apr. 27, 2007, now Pat. No. 7,895,942.

(51) Int. Cl.
*A23B 4/03* (2006.01)
*A23B 4/044* (2006.01)
*B60H 3/00* (2006.01)
*F24C 15/18* (2006.01)
*F24B 5/00* (2006.01)

(52) U.S. Cl.
USPC .................. 99/482; 99/481; 126/17; 126/79

(58) Field of Classification Search
USPC .............. 126/79, 17; 99/481, 482, 399, 340; 426/523; 110/243, 248, 315
See application file for complete search history.

(56) References Cited

U.S. PATENT DOCUMENTS

| | | | |
|---|---|---|---|
| 266,425 A | 10/1882 | Broomell |
| 317,431 A | 5/1885 | Allen |
| 503,872 A | 8/1893 | Petersen |
| 580,753 A | 4/1897 | Barnard |
| 652,531 A | 6/1900 | Carlson |
| 739,214 A | 9/1903 | Phillips |
| 754,557 A | 3/1904 | Greene |
| 777,467 A | 12/1904 | Yuncker |
| 821,487 A | 5/1906 | Hammack |
| 834,229 A | 10/1906 | Blanchard |
| 848,018 A | 3/1907 | Engelhard |
| 904,382 A | 11/1908 | Van Patten |
| 926,531 A | 6/1909 | Williams |

(Continued)

FOREIGN PATENT DOCUMENTS

EP 0373496 6/1990

OTHER PUBLICATIONS

Westley, Erica; IEEE Spectrum Online, "How to Build a Better Barbecue Pit", Jul. 2010 (retrieved Jul. 8, 2010); Retrieved from the Internet: http://spectrum.ieee.org/geek-life/hands-on/how-to-build-a-better-barbecue-pit.

(Continued)

*Primary Examiner* — Henry Yuen
*Assistant Examiner* — Michael Hoang
(74) *Attorney, Agent, or Firm* — Jackson Walker L.L.P.; Christopher J. Rourk

(57) ABSTRACT

A barbecue cooking apparatus is provided. The barbecue cooking apparatus includes a firebox comprising a housing having solid walls. A charcoal tray is disposed within the housing, and one or more vents are disposed in the housing above the charcoal tray. One or more vents are disposed in the charcoal tray. An upper interior chamber within the housing above the charcoal tray is configured to hold wood and charcoal. A lower interior chamber within the housing below the charcoal tray is configured to provide a volume for the collection of wood ash. A duct is attached to the housing and forms a passageway from the lower interior chamber for heated air and wood smoke.

20 Claims, 5 Drawing Sheets

(56) References Cited

U.S. PATENT DOCUMENTS

| | | |
|---|---|---|
| 928,695 A | 7/1909 | Pinegar |
| 934,512 A | 9/1909 | Esposito |
| 1,072,231 A | 9/1913 | Howell |
| 1,150,172 A | 8/1915 | Chadwick |
| 1,189,818 A | 7/1916 | Holloway |
| 1,302,682 A | 5/1919 | Legg |
| 1,486,875 A | 3/1924 | Freeman |
| 1,492,892 A | 5/1924 | Muse |
| 1,534,867 A | 4/1925 | Peschke et al. |
| 1,595,846 A | 8/1926 | Wood |
| 1,751,219 A | 10/1928 | Seamon |
| 1,779,453 A | 10/1930 | Taylor |
| 1,964,372 A | 4/1932 | Tygart |
| 1,952,968 A | 7/1932 | Brand |
| 2,074,945 A | 3/1937 | Skvor |
| 2,096,373 A | 10/1937 | Doherty |
| 2,143,999 A | 1/1939 | Rosson |
| 2,262,910 A | 1/1939 | Aller |
| 2,168,388 A | 8/1939 | Bemis |
| 2,335,217 A | 5/1941 | Tate |
| 2,314,627 A | 3/1943 | Millikan et al. |
| 2,352,590 A | 6/1944 | Trinkle |
| 2,444,985 A | 7/1948 | Fulton |
| 2,505,973 A | 5/1950 | Julian |
| 2,558,569 A | 6/1951 | Koch |
| 2,567,549 A | 9/1951 | Christensen |
| 2,568,022 A | 9/1951 | Parker |
| 2,600,760 A | 6/1952 | Guffey |
| 2,604,033 A | 7/1952 | Chadwick et al. |
| 2,625,095 A | 1/1953 | Julian |
| 2,626,559 A | 1/1953 | Rau |
| 2,640,414 A | 6/1953 | Jensen |
| 2,842,043 A | 10/1954 | Reuland |
| 2,715,870 A | 8/1955 | Rutkowski |
| 2,734,499 A | 2/1956 | Lombardi |
| 2,746,377 A | 5/1956 | Parks |
| 2,760,428 A | 8/1956 | Boyajian |
| 2,789,877 A | 4/1957 | Pfundt |
| 2,790,380 A | 4/1957 | Shryack |
| 2,811,099 A | 10/1957 | McGoldrick |
| 2,833,201 A | 5/1958 | Simank |
| 2,846,937 A | 8/1958 | Jones |
| 2,851,941 A | 9/1958 | Cogar |
| 2,867,165 A | 1/1959 | Money |
| 2,885,950 A | 5/1959 | Stoll et al. |
| 2,894,448 A | 7/1959 | Henderson et al. |
| 2,920,177 A | 1/1960 | Brane |
| 2,930,310 A | 3/1960 | Poppenburg |
| 3,049,071 A | 4/1960 | Diack |
| 2,985,097 A | 5/1961 | Nevin et al. |
| 3,041,959 A | 7/1962 | Oyler |
| 3,087,414 A | 4/1963 | Gannon |
| 3,098,428 A | 7/1963 | Maxwell |
| 3,154,005 A | 10/1964 | Roecks et al. |
| 3,190,281 A | 6/1965 | Northwood |
| 3,199,436 A | 8/1965 | Rasmussen et al. |
| 3,217,634 A | 11/1965 | Fox |
| 3,220,336 A | 11/1965 | Hoover |
| 3,223,022 A | 12/1965 | Powell |
| 3,247,827 A | 4/1966 | Cremer |
| 3,266,409 A | 8/1966 | Oyler |
| 3,279,452 A | 10/1966 | Hottenroth et al. |
| 3,316,831 A | 5/1967 | Koland et al. |
| 3,324,788 A | 6/1967 | La France |
| 3,340,794 A | 9/1967 | Giuliano |
| 3,361,055 A | 1/1968 | Hondroulis |
| 3,364,912 A | 1/1968 | Dills et al. |
| 3,379,190 A | 4/1968 | Leach |
| 3,380,444 A | 4/1968 | Stalker |
| 3,397,632 A | 8/1968 | Moler |
| 3,435,754 A | 4/1969 | Lohr et al. |
| 3,438,364 A | 4/1969 | Galloway, Jr. |
| 3,455,233 A | 7/1969 | Cable |
| 3,474,725 A | 10/1969 | McClaren |
| 3,477,360 A | 11/1969 | Raney |
| 3,491,678 A | 1/1970 | Oyler |
| 3,513,823 A | 5/1970 | Fessmann |
| 3,517,602 A | 6/1970 | Horton |
| 3,524,403 A | 8/1970 | Treloar et al. |
| 3,543,672 A | 12/1970 | Payonk |
| 3,552,299 A | 1/1971 | Patoka |
| 3,561,348 A | 2/1971 | Weir, Sr. |
| 3,568,590 A | 3/1971 | Grice |
| 3,583,307 A | 6/1971 | Lee, Sr. |
| 3,589,269 A | 6/1971 | Weir, Sr. |
| 3,601,280 A | 8/1971 | Mills |
| 3,611,911 A | 10/1971 | Martin |
| 3,612,032 A | 10/1971 | Kweller et al. |
| 3,623,423 A | 11/1971 | Berger |
| 3,644,124 A | 2/1972 | Bedsole |
| 3,658,047 A | 4/1972 | Happel |
| 3,665,840 A | 5/1972 | Horany |
| 3,683,791 A | 8/1972 | Rast, Jr. |
| 3,696,803 A | 10/1972 | Holloway, Jr. |
| 3,699,876 A | 10/1972 | Ellis |
| 3,721,177 A | 3/1973 | Booker |
| 3,742,838 A | 7/1973 | Luschen et al. |
| 3,747,513 A | 7/1973 | Seelbach |
| 3,756,140 A | 9/1973 | Kolivas |
| 3,757,675 A | 9/1973 | Wilbricht |
| 3,789,824 A | 2/1974 | Mason |
| 3,792,654 A | 2/1974 | Turner |
| 3,809,056 A | 5/1974 | Snelling |
| 3,832,989 A | 9/1974 | Belford |
| 3,841,211 A | 10/1974 | Ellis |
| 3,882,767 A | 5/1975 | Oyler et al. |
| 3,903,788 A | 9/1975 | Freeland et al. |
| 3,913,557 A | 10/1975 | Ewanika et al. |
| 3,933,144 A | 1/1976 | Bandy |
| 3,937,138 A | 2/1976 | Tidwell |
| 3,938,494 A | 2/1976 | Clark |
| 3,951,052 A | 4/1976 | Ringo |
| 3,961,571 A | 6/1976 | Decuir |
| 3,967,547 A | 7/1976 | Sykes et al. |
| 3,971,308 A | 7/1976 | Parker |
| 3,982,476 A | 9/1976 | McLane |
| 3,982,522 A | 9/1976 | Hottenroth et al. |
| 3,991,666 A | 11/1976 | Tidwell et al. |
| 4,043,312 A | 8/1977 | Kern |
| 4,072,092 A | 2/1978 | Kohli et al. |
| 4,076,008 A | 2/1978 | Deaton |
| 4,089,258 A | 5/1978 | Berger |
| 4,094,295 A | 6/1978 | Boswell et al. |
| 4,094,296 A | 6/1978 | Beagley |
| 4,130,052 A | 12/1978 | Jacobson |
| 4,162,650 A | 7/1979 | Davis et al. |
| 4,165,683 A | 8/1979 | Van Gilst |
| 4,167,398 A | 9/1979 | Hughes et al. |
| 4,170,173 A | 10/1979 | Bradford |
| 4,184,420 A | 1/1980 | Podaras et al. |
| 4,190,677 A | 2/1980 | Robins |
| 4,232,597 A | 11/1980 | Perrine et al. |
| 4,300,523 A | 11/1981 | Robertson et al. |
| 4,307,659 A | 12/1981 | Martin et al. |
| 4,309,938 A | 1/1982 | Harmon |
| 4,334,462 A | 6/1982 | Hefling |
| 4,348,948 A | 9/1982 | Allison |
| 4,355,570 A | 10/1982 | Martin et al. |
| 4,362,093 A | 12/1982 | Griscom |
| 4,374,489 A | 2/1983 | Robbins |
| 4,383,518 A | 5/1983 | Beausoleil |
| 4,392,419 A | 7/1983 | Bonny |
| 4,401,018 A | 8/1983 | Berry |
| 4,418,615 A * | 12/1983 | Higgins ............... 99/331 |
| 4,434,781 A | 3/1984 | Koziol |
| 4,442,762 A | 4/1984 | Beller |
| 4,467,709 A | 8/1984 | Anstedt |
| 4,471,748 A | 9/1984 | Venable |
| 4,474,107 A | 10/1984 | Cothran |
| 4,495,860 A | 1/1985 | Hitch et al. |
| 4,510,854 A | 4/1985 | Robertson |
| 4,512,249 A | 4/1985 | Mentzel |
| 4,554,864 A | 11/1985 | Smith et al. |
| 4,572,062 A | 2/1986 | Widdowson |

(56) References Cited

U.S. PATENT DOCUMENTS

| | | | |
|---|---|---|---|
| 4,574,689 A | 3/1986 | Robertson | |
| 4,643,162 A | 2/1987 | Collins | |
| 4,664,026 A | 5/1987 | Milloy | |
| 4,669,447 A | 6/1987 | Kelly | |
| 4,690,125 A | 9/1987 | Beller | |
| 4,697,506 A | 10/1987 | Ducate, Jr. | |
| 4,700,618 A * | 10/1987 | Cox, Jr. | 99/339 |
| 4,702,224 A | 10/1987 | Griffith | |
| 4,721,037 A | 1/1988 | Blosnich | |
| 4,750,469 A | 6/1988 | Biggs | |
| 4,757,756 A * | 7/1988 | Van Marr | 99/482 |
| 4,762,059 A | 8/1988 | McLane, Sr. | |
| 4,770,157 A | 9/1988 | Shepherd et al. | |
| 4,773,319 A | 9/1988 | Holland | |
| 4,779,525 A | 10/1988 | Gaines | |
| 4,787,914 A | 11/1988 | Crace | |
| 4,810,510 A | 3/1989 | Lever et al. | |
| 4,823,684 A | 4/1989 | Traeger et al. | |
| 4,825,845 A | 5/1989 | Olivotti | |
| 4,857,074 A | 8/1989 | Crace | |
| 4,867,050 A | 9/1989 | Patenaude et al. | |
| 4,878,477 A | 11/1989 | McLane | |
| 4,882,985 A | 11/1989 | Beller | |
| 4,895,130 A | 1/1990 | Staschke | |
| 4,896,472 A | 1/1990 | Hunt | |
| 4,899,721 A | 2/1990 | Tsay | |
| 4,909,137 A | 3/1990 | Brugnoli | |
| 4,909,235 A | 3/1990 | Boetcker | |
| 4,909,970 A | 3/1990 | Pardo | |
| 4,934,260 A | 6/1990 | Blevins | |
| 4,934,272 A | 6/1990 | Sternin et al. | |
| 4,957,039 A | 9/1990 | Reyes | |
| 4,962,696 A | 10/1990 | Gillis | |
| 4,962,697 A | 10/1990 | Farrar | |
| 4,979,436 A | 12/1990 | McGowan | |
| 5,009,151 A | 4/1991 | Hungerford | |
| 5,031,602 A | 7/1991 | Vick | |
| 5,070,776 A | 12/1991 | Schlosser et al. | |
| 5,096,727 A | 3/1992 | Crace | |
| 5,097,817 A | 3/1992 | Dodgen | |
| 5,108,282 A | 4/1992 | Pardo | |
| 5,121,676 A | 6/1992 | Jurgens | |
| 5,129,385 A | 7/1992 | Dodgen | |
| 5,144,939 A | 9/1992 | Christopherson | |
| 5,156,140 A | 10/1992 | Zisman | |
| 5,158,066 A | 10/1992 | Dodgen | |
| 5,163,359 A | 11/1992 | McLane, Sr. | |
| 5,167,183 A | 12/1992 | Schlosser et al. | |
| 5,176,067 A | 1/1993 | Higgins | |
| 5,176,124 A | 1/1993 | Wrasse | |
| 5,191,831 A | 3/1993 | Walden | |
| 5,193,445 A | 3/1993 | Ferguson | |
| 5,195,423 A | 3/1993 | Beller | |
| 5,197,379 A | 3/1993 | Leonard, Jr. | |
| 5,222,475 A | 6/1993 | Greener | |
| 5,242,703 A | 9/1993 | Stewart | |
| 5,251,607 A | 10/1993 | Traeger et al. | |
| 5,279,214 A | 1/1994 | Lamendola | |
| 5,284,671 A | 2/1994 | Stewart | |
| 5,301,606 A | 4/1994 | Ferguson | |
| 5,313,877 A | 5/1994 | Holland | |
| 5,325,841 A | 7/1994 | Hooper, Sr. | |
| 5,359,923 A | 11/1994 | Boswell | |
| 5,359,988 A | 11/1994 | Hait | |
| 5,363,752 A | 11/1994 | Weil | |
| 5,373,778 A | 12/1994 | Moreth | |
| 5,404,801 A | 4/1995 | Holland | |
| 5,427,805 A | 6/1995 | Crace | |
| 5,431,093 A | 7/1995 | Dodgen | |
| 5,437,222 A | 8/1995 | Franklin | |
| 5,460,159 A | 10/1995 | Bussey | |
| 5,467,692 A | 11/1995 | Perez, III | |
| 5,473,979 A | 12/1995 | Ruben | |
| 5,512,312 A | 4/1996 | Forney et al. | |
| 5,515,774 A | 5/1996 | Swisher et al. | |
| 5,528,984 A | 6/1996 | Saurwein | |
| 5,531,154 A | 7/1996 | Perez et al. | |
| 5,560,285 A | 10/1996 | Moreth | |
| 5,582,094 A | 12/1996 | Peterson et al. | |
| 5,617,778 A | 4/1997 | Schroeter et al. | |
| 5,673,613 A | 10/1997 | Price | |
| 5,676,048 A | 10/1997 | Schroeter et al. | |
| 5,711,209 A | 1/1998 | Guines | |
| 5,713,267 A | 2/1998 | Wilson | |
| 5,755,154 A | 5/1998 | Schroeter et al. | |
| 5,768,977 A | 6/1998 | Parris et al. | |
| 5,850,780 A | 12/1998 | Mascia et al. | |
| 5,865,099 A | 2/1999 | Waugh | |
| 5,865,100 A | 2/1999 | Knowles | |
| 5,891,498 A | 4/1999 | Boehler | |
| 5,942,142 A | 8/1999 | Forney et al. | |
| 5,952,029 A | 9/1999 | Freel | |
| 5,967,135 A | 10/1999 | Shariat | |
| 5,979,437 A * | 11/1999 | Eberhardt | 126/517 |
| 5,996,572 A * | 12/1999 | Ilagan | 126/25 AA |
| 6,012,381 A | 1/2000 | Hawn | |
| 6,035,770 A | 3/2000 | Whitefield | |
| 6,041,695 A | 3/2000 | Kuopus | |
| 6,050,177 A | 4/2000 | Lassig, Jr. | |
| 6,050,257 A | 4/2000 | Bond | |
| 6,059,849 A | 5/2000 | Lewis | |
| 6,095,132 A | 8/2000 | Ganard et al. | |
| 6,123,015 A | 9/2000 | McLain et al. | |
| 6,125,838 A * | 10/2000 | Hedgpeth | 126/41 R |
| 6,155,160 A | 12/2000 | Hochbrueckner | |
| 6,167,797 B1 | 1/2001 | Bollich | |
| 6,223,737 B1 | 5/2001 | Buckner | |
| 6,230,700 B1 | 5/2001 | Daniels et al. | |
| 6,316,040 B1 | 11/2001 | Freel | |
| 6,523,463 B1 | 2/2003 | Hogle | |
| 6,557,545 B2 | 5/2003 | Williams | |
| 6,595,197 B1 | 7/2003 | Ganard | |
| 6,651,646 B1 | 11/2003 | Loyd et al. | |
| 6,701,829 B2 | 3/2004 | Farrow | |
| 6,705,213 B1 * | 3/2004 | Thomas | 99/482 |
| 6,708,604 B1 | 3/2004 | Deichler, Jr. | |
| 6,789,462 B1 | 9/2004 | Hamilton | |
| 6,810,792 B1 | 11/2004 | Knight | |
| 6,868,777 B1 | 3/2005 | Higgins et al. | |
| 6,874,496 B2 | 4/2005 | Waits et al. | |
| 7,159,509 B2 | 1/2007 | Starkey | |

OTHER PUBLICATIONS

Ellerston, Kristin, Texas Monthly.com, "Smokin'," September [retrieved [Sep. 21, 2010]. Retrieved from the Internet: http://www.texasmonthly.com/cms/printthis.php?file=webextra6.php&issue=2010-09-01.

Stump's Smokers, Internet website http://www.stumpssmokers.com/products1/htm (1 pg), printed Jan. 11, 2008.

* cited by examiner

FIGURE 3
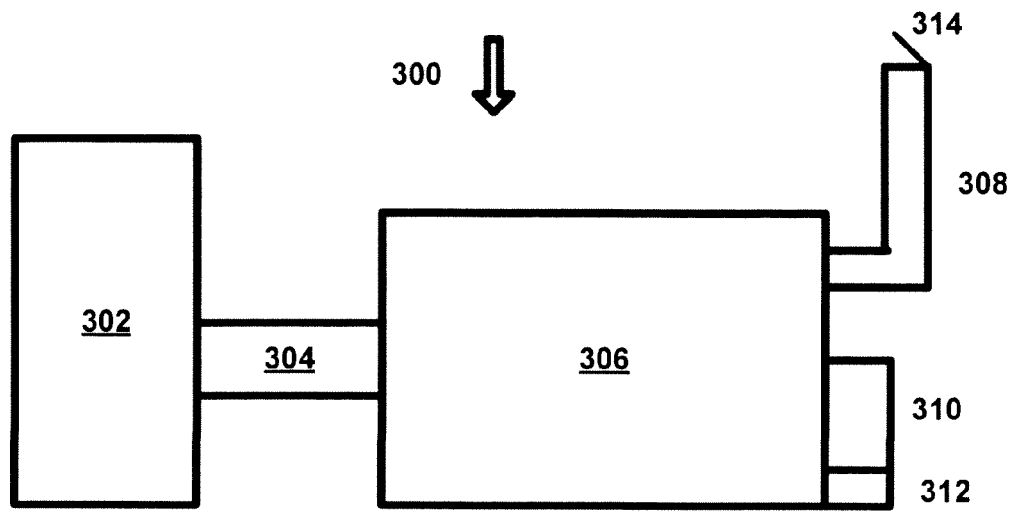
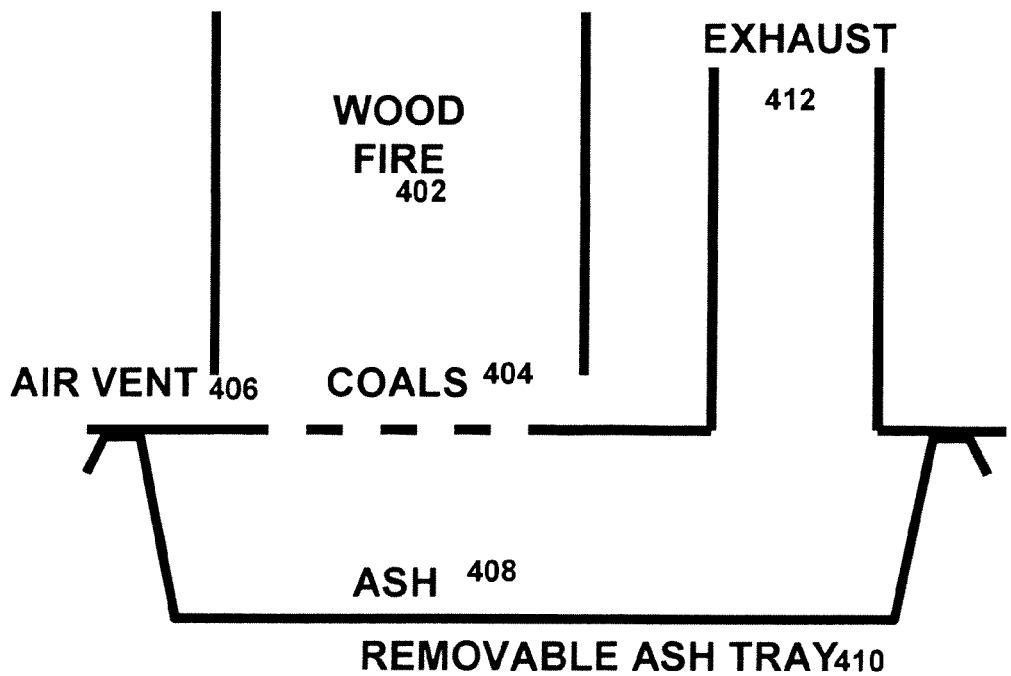

700 ⇨

800 ⇨

BARBECUE FIREBOX AND METHOD OF OPERATION

CROSS REFERENCE TO RELATED APPLICATION

This application is a continuation application of U.S. patent application Ser. No. 11/796,250, filed on Apr. 27, 2007, entitled "Barbecue Firebox and Method of Operation," now U.S. Pat. No. 7,895,942, which is incorporated herein by reference for all purposes.

FIELD OF THE INVENTION

The present invention pertains to the field of cooking apparatuses. More specifically, the invention relates to a barbecue firebox and method of operation that prevents condensation of volatile organic compounds on meat.

BACKGROUND OF THE RELATED ART

Three elements are commonly accepted as definitive of a barbecue cooking process. First, cooking is performed at relatively low temperatures, such as 200 to 300° F., for relatively long periods of time, such as 6 to 20 hours. These temperatures and times reduce temperature gradients within the meat and thereby produce a more uniform cooking process throughout the meat being cooked, and also permit fats and connective tissues to break down, thereby tenderizing the meat.

Second, heat is transferred to the meat primarily through convection of heated air rather than radiation, as in broiling and grilling, or conduction, as in frying, again to reduce temperature gradients within the meat and thereby produce a more uniform cooking process throughout the meat being cooked. In essence, the meat is baked.

Third, heat is produced by the combustion of wood and the baking atmosphere imparts the flavors therefrom to the meat being cooked. This element is the most difficult to satisfy in combination with the first two and merits a brief discussion of wood and wood fires.

Wood is a highly complex organic material, but for the purposes of cooking, it can be modeled simply as the sum of three components: water, volatile organic compounds, known collectively as wood-gas, and carbon, known as charcoal.

In a wood fire, three processes are underway simultaneously. First, newly added wood desiccates. Second, the dry wood decomposes into two fuels: wood-gas and charcoal. Third, provided that sufficient heat and oxygen are present, the two fuels burn: wood-gas as a visible flame and charcoal as glowing embers.

If sufficient heat or oxygen are not available, all or part of the fire will smolder, producing wood-gas that no flame is consuming. The noxious, unburned wood-gas will then condense as wood creosote, a black and tarry film, on any relatively cool surface it encounters. The surface of meat is ideal for this condensation, which accumulates over time and therefore affects larger cuts that cook for longer periods. The film's oily components leach deeply into the meat, rendering it blackened and unpalatable.

SUMMARY OF THE INVENTION

In accordance with the present invention, a barbecue firebox and method of use are provided that overcome known problems with barbecue fireboxes.

In particular, a barbecue firebox and method of use are provided that reduces or prevents the condensation of volatile organic compounds on the meat being cooked.

In accordance with an exemplary embodiment of the present invention, a barbecue cooking apparatus is provided. The barbecue cooking apparatus includes a firebox comprising a housing having solid walls. A charcoal tray is disposed within the housing, and one or more vents are disposed in the housing above the charcoal tray. One or more vents are disposed in the charcoal tray. An upper interior chamber within the housing above the charcoal tray is configured to hold wood and charcoal. A lower interior chamber within the housing below the charcoal tray is configured to provide a volume for the collection of wood ash. A duct is attached to the housing and forms a passageway from the lower interior chamber for heated air and wood smoke.

The present invention provides many important technical advantages. One important technical advantage of the present invention is a barbecue firebox and method of use that allows volatile organic compounds to be fully combusted before being provided to the barbecue pit where the meat is being cooked.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 3 is diagram of a barbecue in accordance with an exemplary embodiment of the present invention;

DETAILED DESCRIPTION OF THE INVENTION

Figure 1:
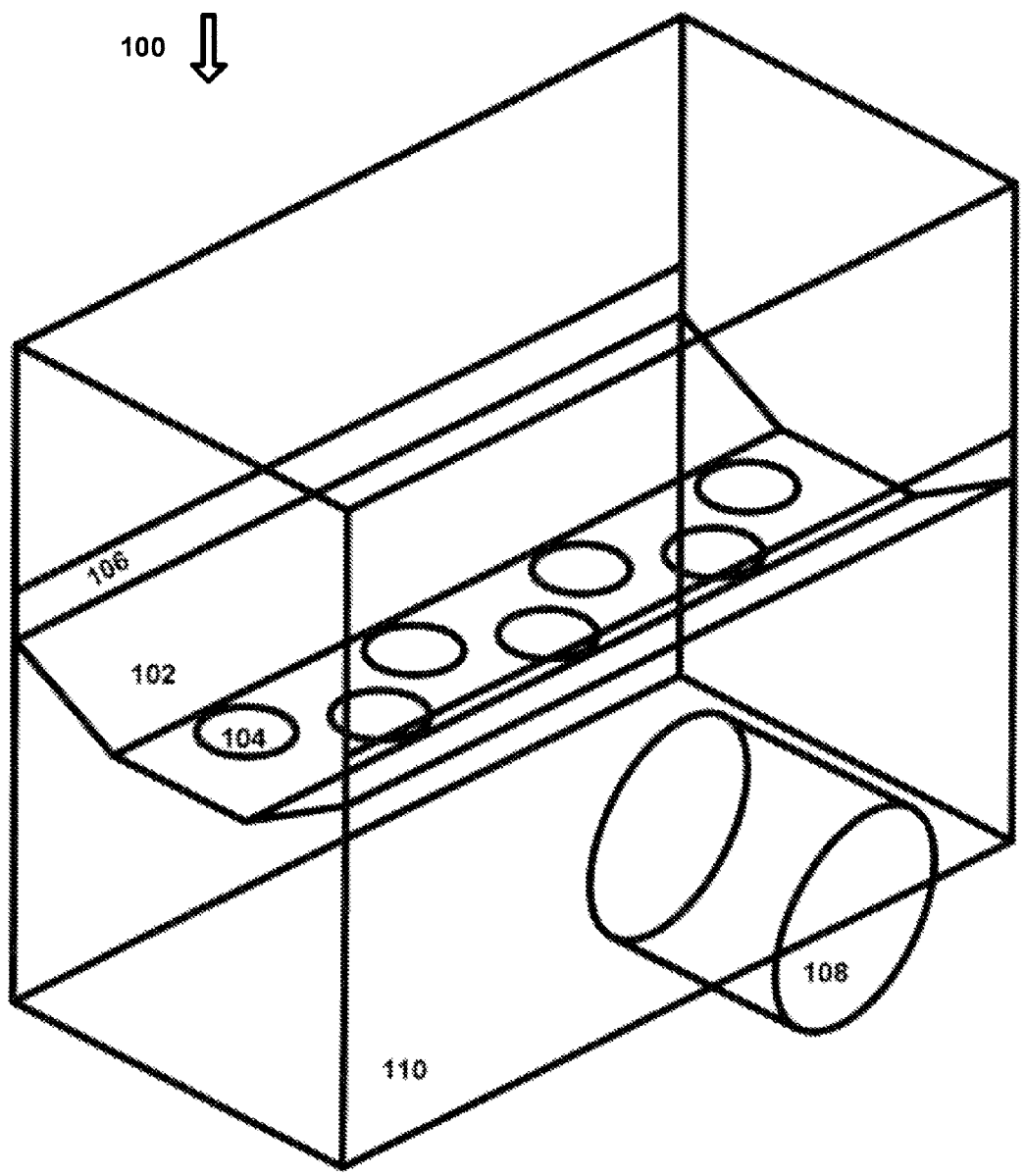
FIG. 1 is a diagram of a firebox in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a firebox 100 in accordance with an exemplary embodiment of the present invention. Firebox 100 provides a source for heat for a barbecue that reduces or eliminates the amount of un-combusted wood gas that can deposit on the surface of the meat being cooked.

Firebox 100 includes charcoal pan 102 with a plurality of vent holes 104. As wood burns in firebox 100, charcoal forms and is supported on charcoal pan 102. Air enters firebox 100 through air vents 106, that are formed on the sides of case 110 above charcoal pan 102. Duct 108 carries the heated air from the burning wood and charcoal to a barbecue compartment (not explicitly shown) where the meat is cooked.

In operation, firebox 100 allows wood to be burned to generate heat and wood flavoring that is carried to a barbecue compartment through duct 108. Charcoal pan 102 supports the burning wood and charcoal, and vents 106 allow air to enter firebox 100 to support combustion.

Wood gas generated by the fire is forced to pass through charcoal pan 102 prior to exiting firebox 100 through duct 108. Since charcoal pan 102 is covered with hot coals that are well-oxygenated via air vents 106, the wood gas is heated and burned as it passes through the coal bed supported by charcoal pan 102. In this manner, the volatile organic compounds are prevented from being deposited on the surface of the meat being cooked.

Figure 2:
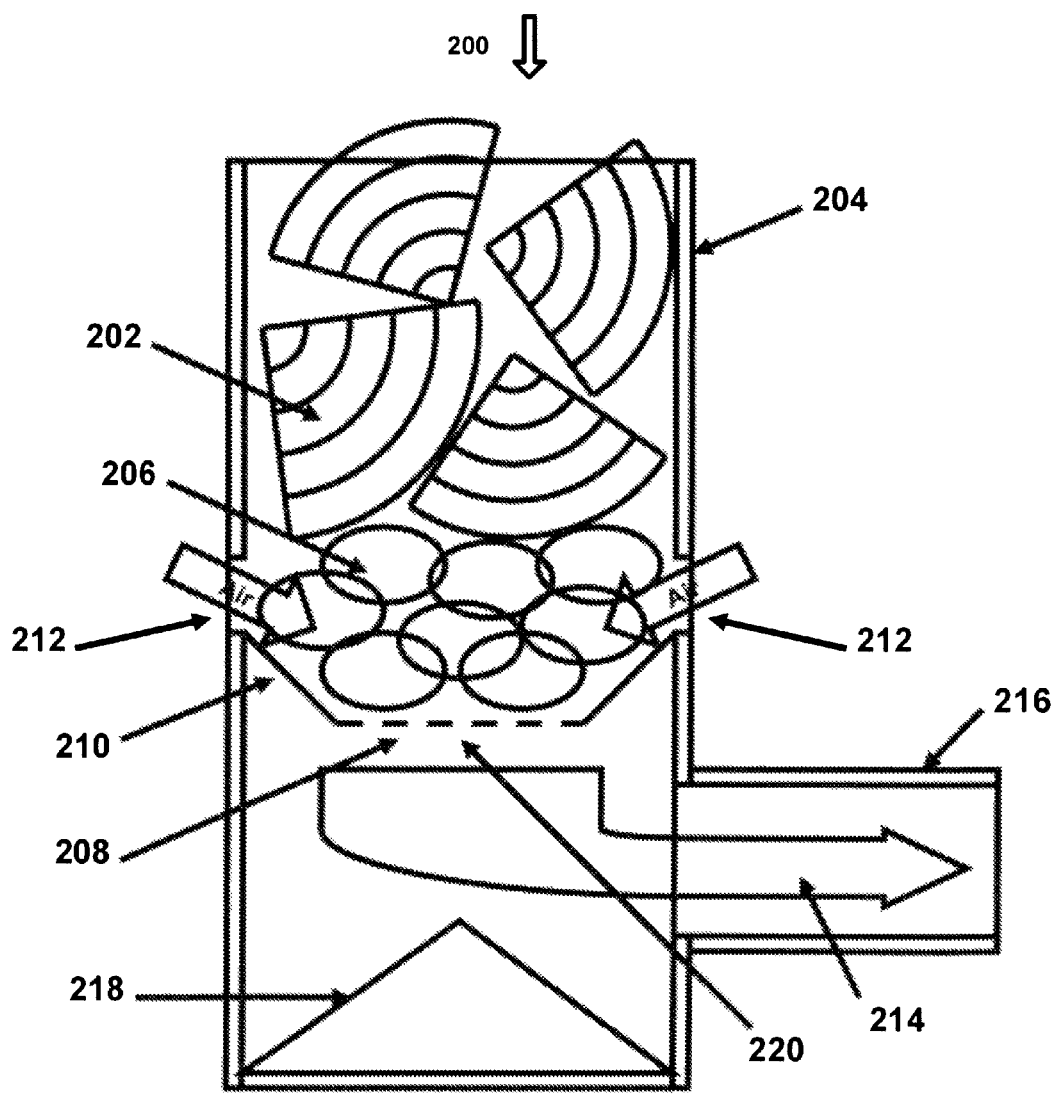
FIG. 2 is diagram of a firebox in accordance with another exemplary embodiment of the present invention.

FIG. 2 is diagram of firebox 200 in accordance with an exemplary embodiment of the present invention. Firebox 200 provides a source for heat for a barbecue that reduces or eliminates the amount of un-combusted wood gas that can deposit on the surface of the meat being cooked.

Firebox 200 includes charcoal pan 210 with a plurality of vent holes 208. As wood 202 burns in firebox 200, charcoal 206 forms and is supported on charcoal pan 210. Air enters firebox 200 through air vents 212, which are formed on the sides of case 204 above charcoal pan 210. Duct 216 carries the heated air 214 from the burning wood 202 and charcoal 206 to a barbecue compartment (not explicitly shown) where the meat is cooked.

In operation, firebox 200 allows wood 202 to be burned to generate heat and wood flavoring that is carried to a barbecue compartment through duct 216. Charcoal pan 210 supports the burning wood 202 and charcoal 206, and vents 212 allow air to enter firebox 200 to support combustion.

Wood gas generated by the fire is forced to pass through charcoal pan 210 prior to exiting firebox 200 through duct 216. Since charcoal pan 210 is covered by hot coals that are well-oxygenated via air vents 212, the wood gas is heated and burned as it passes through the coal bed supported by charcoal pan 210. In this manner, the volatile organic compounds are prevented from being deposited on the surface of the meat being cooked.

FIG. 3 is diagram of barbecue 300 in accordance with an exemplary embodiment of the present invention. Barbecue 300 includes firebox 302, which can include the inventive features shown in FIGS. 1, 2, 4, 5, 6, 7, and 8, duct 304 and barbecue pit 306. Hot air formed from the combustion of wood travels from firebox 302 to barbecue pit 306 through duct 304, and cooks the meat in barbecue pit 306. A chimney 308 or exhaust fan 310 can be used to generate negative pressure within barbecue pit 306, so as to draw the heated combustion products from firebox 302. The chimney 308 can further include an adjustable damper 314 so as to control the negative pressure. The exhaust fan 310 can further include a speed control 312 to control the negative pressure.

Figure 4:
FIG. 4 is a diagram of a firebox in accordance with another exemplary embodiment of the present invention.

FIG. 4 is a diagram of a firebox 400 in accordance with another exemplary embodiment of the present invention. Wood fire 402 is located over coals 404. Air vent 406 allows sufficient oxygen to be provided to coals 404 to ensure complete combustion of volatile organic compounds. Removable ash tray 410 holds ash 408 from coals 404 and also forms a sealed duct for transfer of heated combustion products to exhaust 412. As such, instead of the heated combustion products rising through wood fire 402, they are instead drawn though removable ash tray 410 to exhaust 412, which is then provided to a barbecue pit or other suitable cooking structure. In this manner, the amount of uncombusted volatile organic compounds that are provided to the meat that is being cooked is reduced or eliminated.

Figure 5:
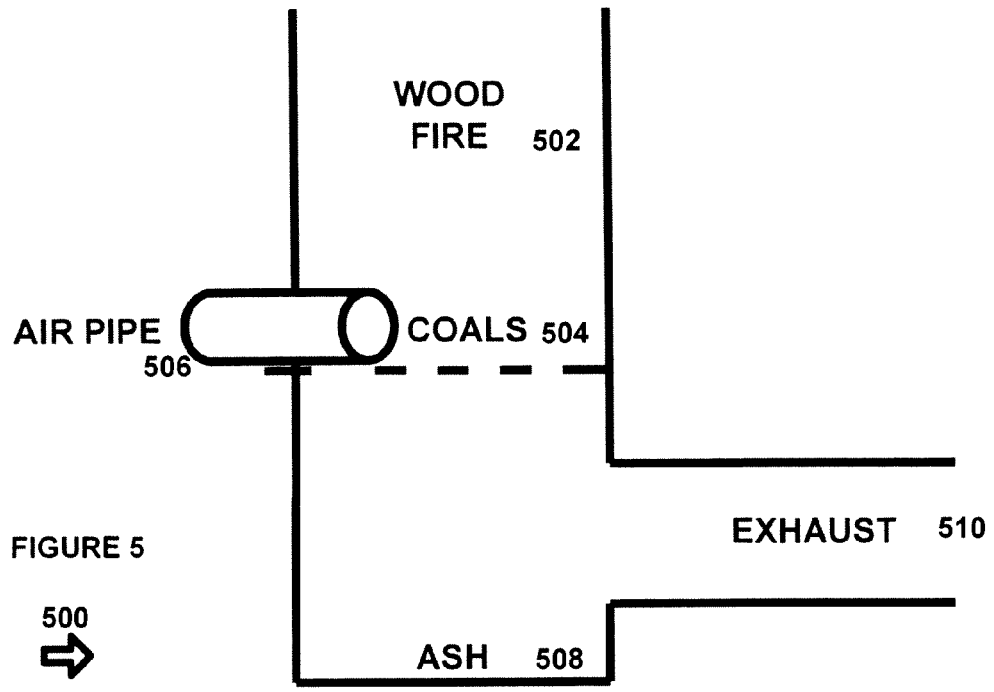
FIG. 5 is diagram of a barbecue in accordance with an exemplary embodiment of the present invention.

FIG. 5 is a diagram of an air pipe fed firebox 500 accordance with an exemplary embodiment of the present invention. Firebox 500 includes wood fire 502 and coals 504, with air pipe 506 configured to provide oxygen to coals 504. Air pipe 506 can be used in addition to vents, and can include a plurality of air pipes that are placed throughout the bed on which coals 504 are burning. Air pipe 506 can also include a fan or other devices that controllably force air into coals 504, so as to ensure that volatile organic compounds are completely combusted as they pass through coals 504 from wood fire 502. Ash 508 accumulates underneath coals 504, and exhaust 510 carries the heated combustion products to a cooking structure, such as a barbeque pit.

Figure 6:
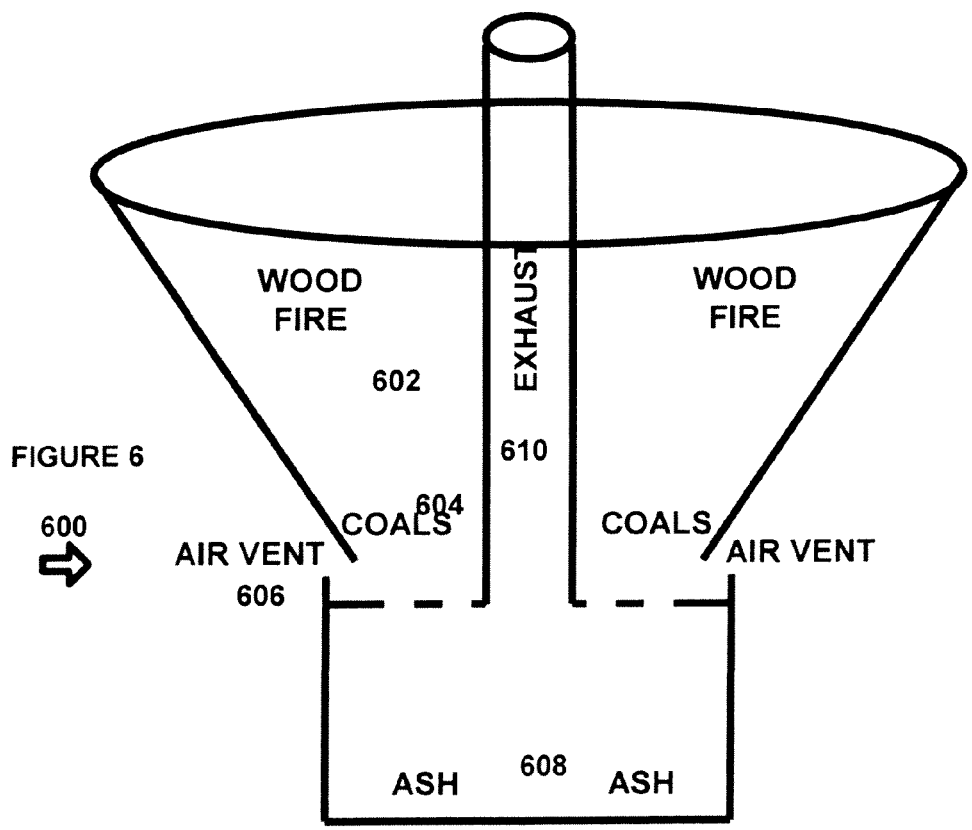
FIG. 6 is diagram of a barbecue in accordance with an exemplary embodiment of the present invention.

FIG. 6 is a diagram of a firebox 600 with a central exhaust in accordance with an exemplary embodiment of the present invention. Firebox 600 includes a wood fire cone 602 that feeds coals 604 towards the bottom of the cone. Air vent 606 provides air to allow complete combustion of volatile organic compounds, and heated combustion products are fed through ash box 608 to exhaust 610, which leads a to barbecue pit or other cooking structure.

Figure 7:
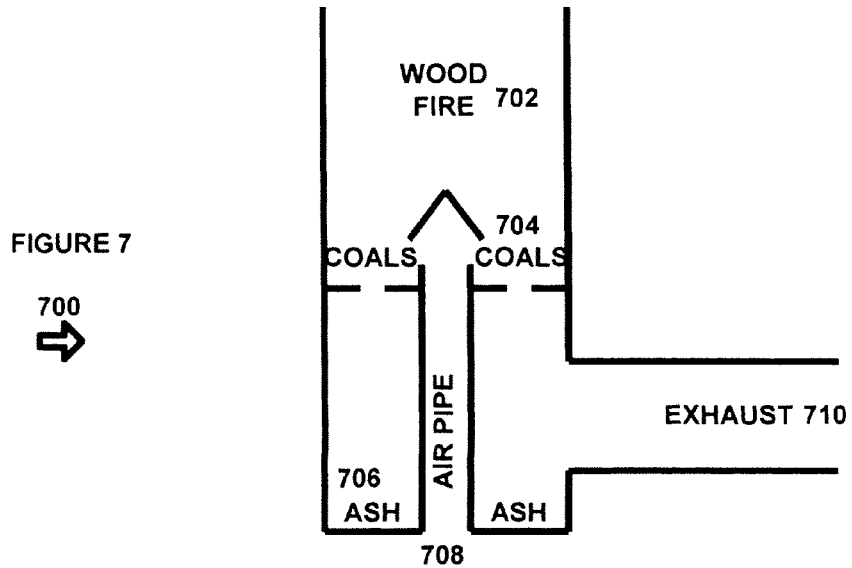
FIG. 7 is diagram of a barbecue in accordance with an exemplary embodiment of the present invention.

FIG. 7 is a diagram of a firebox 700 with a bottom air feed in accordance with an exemplary embodiment of the present invention. Wood fire 702 feeds coals 704, and ash accumulates in ash box 706. Air pipe 708 feeds into coals 704 through ash box 706 and from underneath, so as to ensure complete combustion of volatile organic compounds. Exhaust 710 carries the heated combustion products to a cooking compartment.

Figure 8:
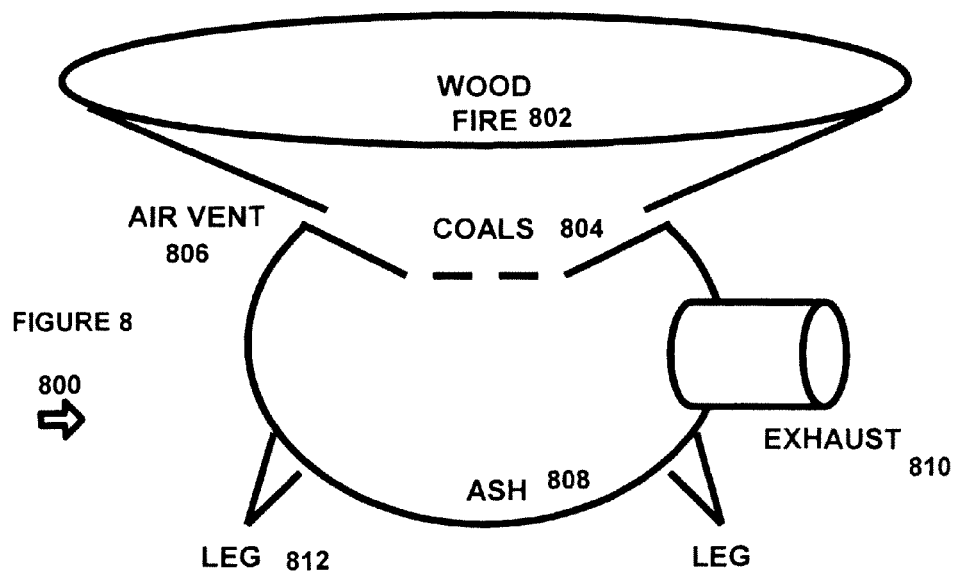
FIG. 8 is diagram of a barbecue in accordance with an exemplary embodiment of the present invention.

FIG. 8 is a diagram of a camp-style firebox 800 in accordance with an exemplary embodiment of the present invention. Wood fire 802 feeds coals 804, and ash accumulates in ash box 808. Vent 806 feeds into coals 804, so as to ensure complete combustion of volatile organic compounds. Exhaust 810 carries the heated combustion products to a cooking compartment, and legs 812 support ash box 808.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A cooking apparatus comprising:
   an upper chamber;
   a vented charcoal tray disposed below the upper chamber;
   a vent located at a lower position in the upper chamber configured to admit fresh combustion air directly to the vented charcoal tray;
   a second vent located at an upper position of the upper chamber and configured to prevent a buildup of smoke in the upper chamber;
   a lower chamber below the vented charcoal tray configured to provide for the collection of ash; and
   a duct attached to a bottom sidewall of the lower chamber and forming an isolated passageway from the lower chamber to a cooking chamber for combustion gases, the duct being located away from the lower chamber area where the ash is collected and shielded from the collected ash;
   wherein the cooking apparatus is configured to draw combustion gases from the upper chamber downward through the vented charcoal tray, in opposition to a natural upward draft, and to mix the combustion gases with the fresh combustion air from the vent.

2. The cooking apparatus of claim 1, wherein the vented charcoal tray comprises a charcoal tray with a plurality of vent holes.

3. The cooking apparatus of claim 1, wherein the upper chamber comprises a firebox.

4. The cooking apparatus of claim 1 further comprising an exhaust fan.

5. The cooking apparatus of claim 1 further comprising an exhaust an coupled to the cooking chamber.

6. The cooking apparatus of claim 1 further comprising a controlled exhaust fan.

7. The cooking apparatus of claim 1 wherein the cooking chamber further comprises a forced draft fan attached to the cooking chamber and configured to draw combusted wood gas out of the cooking chamber.

8. The cooking apparatus of claim 1 further comprising a forced draft fan configured to draw combusted wood gas through the vented charcoal tray.

9. The cooking apparatus of claim 1 further comprising opposing vents on opposite sides of the vented charcoal tray.

10. A cooking apparatus comprising:
an upper chamber;
a vent located at a lower position in the upper chamber configured to admit fresh combustion air directly to a fuel source;
a lower chamber below the fuel source configured to provide for the collection of ash; and
a duct attached to a bottom sidewall of the lower chamber and forming an isolated passageway from the lower chamber to a cooking chamber for combustion gases, the duct being located away from the lower chamber area where the ash is collected and shielded from the collected ash;
a vented charcoal tray disposed within the upper chamber, adjacent to the vent;
a second vent located at an upper position of the upper chamber and configured to prevent a buildup of smoke in the upper chamber;
wherein the cooking apparatus is configured to force combustion gases withdrawn via the duct to first pass downward, in opposition to a natural upward draft.

11. The cooking apparatus of claim 10 wherein the cooking chamber further comprises a forced draft fan attached to the cooking chamber and configured to draw combusted wood gas out of the cooking chamber.

12. The cooking apparatus of claim 10 further comprising a forced draft fan configured to draw combusted wood gas through the vented charcoal tray.

13. The cooking apparatus of claim 10 further comprising opposing vents on opposite sides of the vented charcoal tray.

14. The cooking apparatus of claim 10, wherein the vented charcoal tray comprises a charcoal tray with a plurality of vent holes.

15. The cooking apparatus of claim 10 further comprising an exhaust fan.

16. The cooking apparatus of claim 10 further comprising an exhaust fan coupled to the cooking chamber.

17. The cooking apparatus of claim 10 further comprising a controlled exhaust fan.

18. A cooking apparatus comprising:
an upper chamber configured to generate wood gas;
a vented charcoal tray disposed below the upper chamber;
a vent located adjacent to the vented charcoal tray and configured to admit fresh combustion air directly to the vented charcoal tray;
a second vent located at an upper position of the upper chamber and configured to prevent a buildup of smoke in the upper chamber;
a lower chamber below the vented charcoal tray; and
a duct having a first end attached to a bottom sidewall of the lower chamber and configured to draw the wood gas from the upper chamber through the vented charcoal tray and to draw fresh combustion air through the vent to the vented charcoal tray so as to facilitate combustion of the wood gas as it passes into the lower chamber, the duct configured to be shielded from collected ash.

19. The cooking apparatus of claim 18 further comprising:
a cooking chamber attached to a second end of the duct;
a forced draft fan attached to the cooking chamber and configured to draw combusted wood gas out of the cooking chamber.

20. The cooking apparatus of claim 18 further comprising opposing vents on opposite sides of the vented charcoal tray.

* * * * *

UNITED STATES PATENT AND TRADEMARK OFFICE
CERTIFICATE OF CORRECTION

PATENT NO. : 8,635,947 B2  
APPLICATION NO. : 13/038212  
DATED : January 28, 2014  
INVENTOR(S) : William H. Karau Page 1 of 1

It is certified that error appears in the above-identified patent and that said Letters Patent is hereby corrected as shown below:

In the Claims

Claim 5, Column 5, line 9, replace "an" with "fan"

Signed and Sealed this
Eighth Day of April, 2014

Michelle K. Lee
*Deputy Director of the United States Patent and Trademark Office*